Patented Oct. 22, 1929

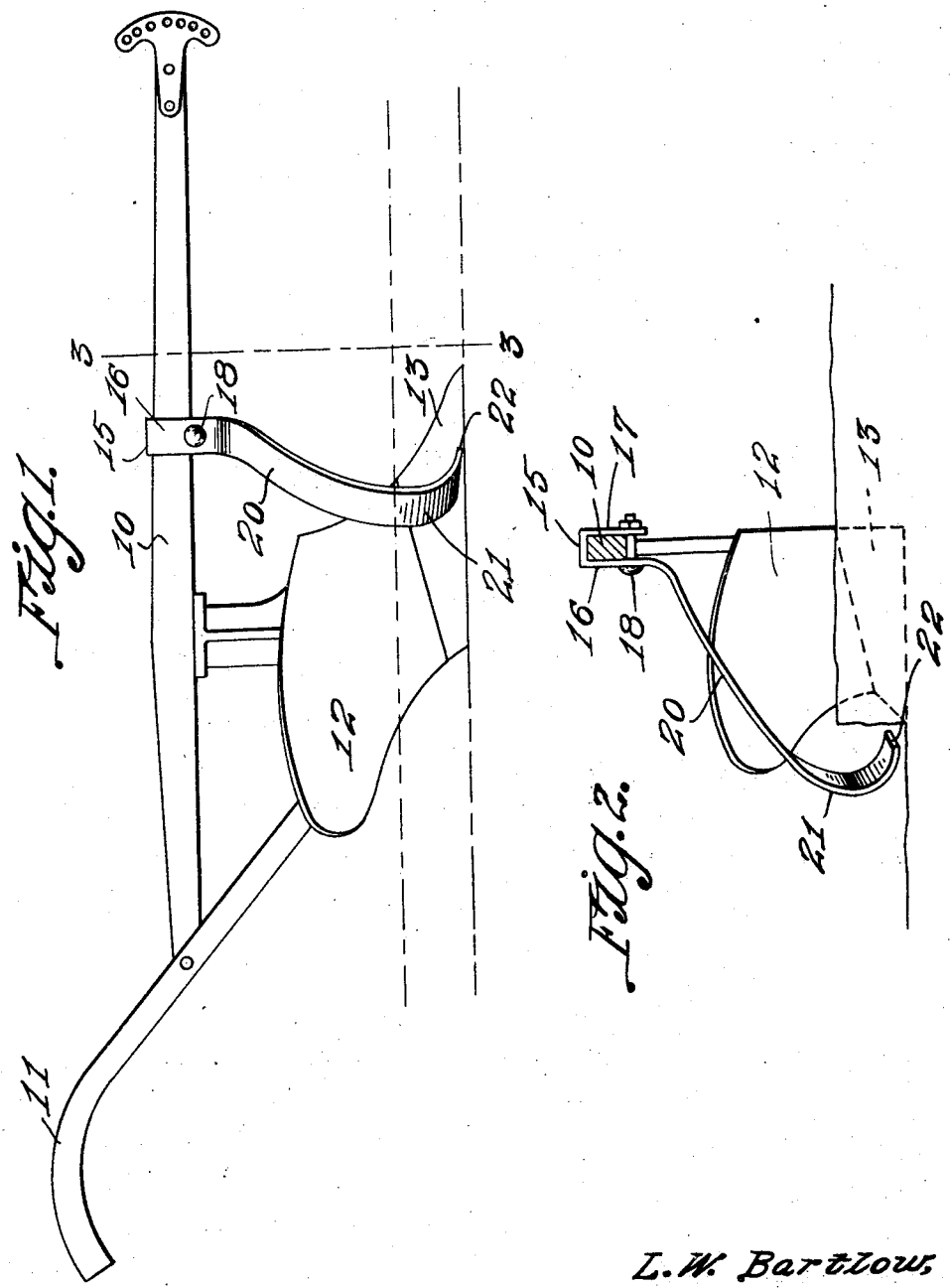

1,733,046

UNITED STATES PATENT OFFICE

LOWELL W. BARTLOW, OF TURBOTVILLE, PENNSYLVANIA

ATTACHMENT FOR PLOWS

Application filed September 25, 1926, Serial No. 137,781. Renewed July 15, 1929.

The object of this invention is to provide an attachment for plows designed to guide corn stalks into the furrow, so that a harrow passing over the plowed ground will not disturb the stalks.

A further object is to provide a resilient device including an upper element constituting a bracket or the like, and an arm or blade connected with the bracket and extending downwardly therefrom, this blade being curved outwardly and downwardly, and then curved inwardly near the bottom, the convex portion of the blade following the furrow and accurately directing the stalks thereinto, in such position that they will not readily become displaced.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 is a view in side elevation, showing a plow of a standard type, with the device forming the subject matter of the present application attached to the plow beam.

Figure 2 is a section on line 2—2 of Figure 1.

The plow beam is designated 10, the handles are shown at 11, a mold-board is designated 12 and a plowshare is shown at 13. These elements may be of a standard type of construction, and the attachment herein disclosed will be manufactured to fit different standard types, being capable of use with practically all plows of the general class referred to.

The device of Figure 4, constituting the attachment, may be formed, if desired, in one piece, and of resilient material, so that in the event that the portion extending into the furrow strikes a stone, it will yield sufficiently to prevent breakage, under all usual conditions.

A U-shaped bracket includes a central portion 15 and sides 16 and 17, this bracket being proportioned to fit the plow beam closely, and the bracket being secured by a bolt 18 adapted to pass thru apertures 19 in opposite sides of the bracket.

The blade is curved outwardly and downwardly with reference to the bracket and with reference to the plow beam, the upper portion of the blade being shown at 20, and from this point the blade has a decided curvature as indicated at 21, this portion being approximately semi-circular in form, if desired.

The lower end of the blade, designated 22, is inwardly turned, and from one point of view the device resembles a hook, but more particularly a stalk guiding device adapted to travel along the furrow, and to guide the stalks directly into the furrow, so that they will not be engaged by a harrow or the like traveling over the surface of the plowed ground.

Particular emphasis is placed on the form of the blade or arm, as it is obvious that any other form not closely approximating the construction here disclosed, would permit the stalks to take some other course, instead of being guided directly into the furrow.

Having described the invention what is claimed is:—

An attachment for plows, comprising a U-shaped mounting element to be connected with a plow beam, and having an outwardly and downwardly extending blade, the blade being concave on the inner side and being positioned adjacent to the forward portion of the mold-board, said element being of resilient material, and having a relatively broad surface portion toward the plow and deflected outwardly and forwardly with reference to the plow, producing a scoop-like effect for moving the stalks toward a furrow made by the plow.

In testimony whereof I affix my signature.

LOWELL W. BARTLOW.